(12) United States Patent
Ordonez et al.

(10) Patent No.: US 12,291,334 B2
(45) Date of Patent: May 6, 2025

(54) MULTI-MEDIA PARCEL TRANSPORTATION SYSTEMS AND METHODS

(71) Applicant: The Florida State University Research Foundation, Inc., Tallahassee, FL (US)

(72) Inventors: Camilo Ordonez, Tallahassee, FL (US); Christian Hubicki, Tallahassee, FL (US)

(73) Assignee: THE FLORIDA STATE UNIVERSITY RESEARCH FOUNDATION, INC., Tallahassee, FL (US)

(*) Notice: Subject to any disclaimer, the term of this patent is extended or adjusted under 35 U.S.C. 154(b) by 232 days.

(21) Appl. No.: 18/184,930

(22) Filed: Mar. 16, 2023

(65) Prior Publication Data

US 2023/0294830 A1    Sep. 21, 2023

Related U.S. Application Data

(60) Provisional application No. 63/320,507, filed on Mar. 16, 2022.

(51) Int. Cl.
| | | |
|---|---|---|
| *B64U 10/14* | (2023.01) | |
| *B64D 1/22* | (2006.01) | |
| *B64U 80/86* | (2023.01) | |
| *B64U 101/64* | (2023.01) | |
| *G05D 1/00* | (2006.01) | |

(52) U.S. Cl.
CPC .............. *B64D 1/22* (2013.01); *B64U 10/14* (2023.01); *B64U 80/86* (2023.01); *G05D 1/0607* (2013.01); *G05D 1/0808* (2013.01); *B64U 2101/64* (2023.01); *B64U 2201/10* (2023.01)

(58) Field of Classification Search
CPC ............ B64U 2101/64; B64U 2201/10; G05D 1/672; G05D 2107/25; G05D 2109/254
See application file for complete search history.

(56) References Cited

U.S. PATENT DOCUMENTS

| 11,249,481 B2* | 2/2022 | Kline .................. G05D 1/0206 |
| 2016/0018224 A1* | 1/2016 | Isler ..................... G06Q 10/047 |
| | | 701/25 |
| 2018/0095464 A1* | 4/2018 | Takayama ............ G05D 1/0088 |

FOREIGN PATENT DOCUMENTS

BR        202018074703 Y1 *  6/2024

OTHER PUBLICATIONS

BR-202018074703, Lopes de Menezes et al. (English translation) (Year: 2024).*

* cited by examiner

*Primary Examiner* — Kito R Robinson
*Assistant Examiner* — Roy Rhee
(74) *Attorney, Agent, or Firm* — Eversheds Sutherland (US) LLP

(57) ABSTRACT

Multi-media parcel delivery systems and associated methods are provided herein including systems capable of delivering a parcel through air and one or more bodies of water. In certain embodiments, an aerial vehicle is configured to couple to the parcel using a cable. A control system is used to control operating parameters including velocity, altitude, and pose of the aerial vehicle, and a length and orientation of the cable extending between the aerial vehicle and the parcel.

17 Claims, 10 Drawing Sheets

MULTI-MEDIA PARCEL TRANSPORTATION SYSTEMS AND METHODS

CROSS-REFERENCE TO RELATED APPLICATION

This application claims priority to U.S. Provisional Patent Application No. 63/320,507, filed Mar. 16, 2022, which is incorporated herein by reference.

FIELD OF THE DISCLOSURE

This disclosure relates generally to delivery systems and more particularly to multi-media parcel delivery systems, and methods of delivering parcels.

BACKGROUND

Complex transport and exploratory missions may include wheeled, legged, aerial, surface, underwater, and hybrid platforms. Current popular methods of parcel delivery with an aerial vehicle are single-media focused, only traveling in the air, which requires more energy and is more visible than multi-media systems.

Conventional quadcopters are focused on air as single media systems and have exploited differential flatness to minimize snap. A feedback controller has been used in a planar case to track the attitude of the aerial vehicle or the load. Control laws have already been design to stabilize related systems. Vision-based systems have also been demonstrated to perform closed-loop payload control in 3D space. Air-media maneuvers including throwing payloads from quadcopters to a desired target have been achieved. Learning and model predictive control have been demonstrated as approaches to deal with uncertainties in aerodynamic effects and unknown payloads.

Multi-media robotic systems often encounter water terrain with unknown traversability. One approach to measuring traversability (determined by depth, current, soil composition, etc.) is via an in situ underwater sensor attached to a cable which is attached to an aerial vehicle. Conventional systems for mapping bodies of water use satellite multispectral imagery or bathymetric LIDAR and echo sounding. These methods rely on water clarity, low water state, limited cloud cover, and limited white caps. However, these measurements are subject to sudden changes in environmental factors. Accordingly, such a system entails a new motion planning and control problem with mixed resistive media.

It would be desirable to provide improved systems and methods for traversing mixed media systems. It would be desirable, for example, to provide a framework for trajectory planning in mixed air-water media with direct incorporation of uncertainty in the underwater ground surface profile.

BRIEF SUMMARY

In one aspect, a multi-media parcel delivery system is disclosed, which includes an aerial vehicle; a cable connected to the aerial vehicle and configured to connect to a parcel suspended therefrom; and a control system. The control system is configured to control operating parameters of the multi-media parcel delivery system such as velocity, altitude, and pose of the aerial vehicle, and a length and orientation of the cable extending between the aerial vehicle and the parcel. The control system may include one or more sensors configured to collect data relating to the surroundings of the multi-media parcel delivery system and modifying the operating parameters based on data collected from the one or more sensors.

In another aspect, a method is provided for delivering a parcel, the method including loading a parcel onto a cable connected to an aerial vehicle; determining a transport trajectory for the parcel through air and through one or more bodies of water; controlling, with a control system, operating parameters including (i) velocity, altitude, and pose of the aerial vehicle, and (ii) a length and orientation of the cable extending between the aerial vehicle and the parcel; and delivering the parcel. The method may include modifying the operating parameters based on data collected from one or more sensors, the one or more sensors configured to sense sections of the environment.

BRIEF DESCRIPTION OF THE DRAWINGS

The detailed description is set forth with respect to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale.

DETAILED DESCRIPTION

Multi-media parcel delivery systems and methods are disclosed. In embodiments, the system includes a parcel delivery/transportation system that employs an aerial vehicle that drags, via a cable, a suspended parcel in the water, above water, and on the surface of the water. The system exploits buoyant forces to reduce energy consumption, conceal, and transport heavier parcels. Thanks to the maneuverability of the aerial vehicle, the parcel can be manipulated to avoid collisions with natural and man-made structures, to interconnect separated bodies of water, and to perform individualized delivery.

Buoyant force opposes the gravitational force acting on the parcel, which in turn results on a load reduction for the aerial vehicle that is transporting the parcel. The reduction of net airborne weight causes a reduction of energy consumption of the aerial vehicle and thus enables the transport of heavier payloads over longer distances. Due to the cable connection between the aerial vehicle and the parcel, the latter can be autonomously maneuvered in and out of the water through both manipulation of the cable length and altitude of the aerial vehicle to avoid collisions with nature and man-made structures, and to connect bodies of water.

The proposed system has economic potential by opening a novel mode of transport to satisfy fast individualized deliveries over longer distances involving bodies of water (e.g., along rivers, to islands, to vessels, etc.). The device has also potential to assist in surveying applications by carrying and manipulating sensory payloads.

With trajectory optimization that takes into account the type of parcel and the necessary tasks needed to transport the parcel, one medium, or a combination of media, may be preferred to minimize the required transport effort.

In some embodiments, robots may rely on in situ characterization of the media. In some embodiments, the systems and methods include sensors that can be dragged in and out of the water, and even make contact with the bottom surface to characterize key sections of the environment, inform the locomotion and motion planning of agents, and/or enable up-tempo or fast-moving missions.

In particular, a multi-media parcel delivery system is provided that advantageously may reduce energy consumption, conceal parcels, and transport heavier parcels than conventional transportation systems. The multi-media parcel delivery system may be autonomously controlled, requiring little to no human supervision. Simulation studies employing trajectory optimization indicate that for certain payloads or tasks, it is more efficient to drag parcels through water instead of solely carrying the parcel through the air, e.g., above the water.

Figure 1A:
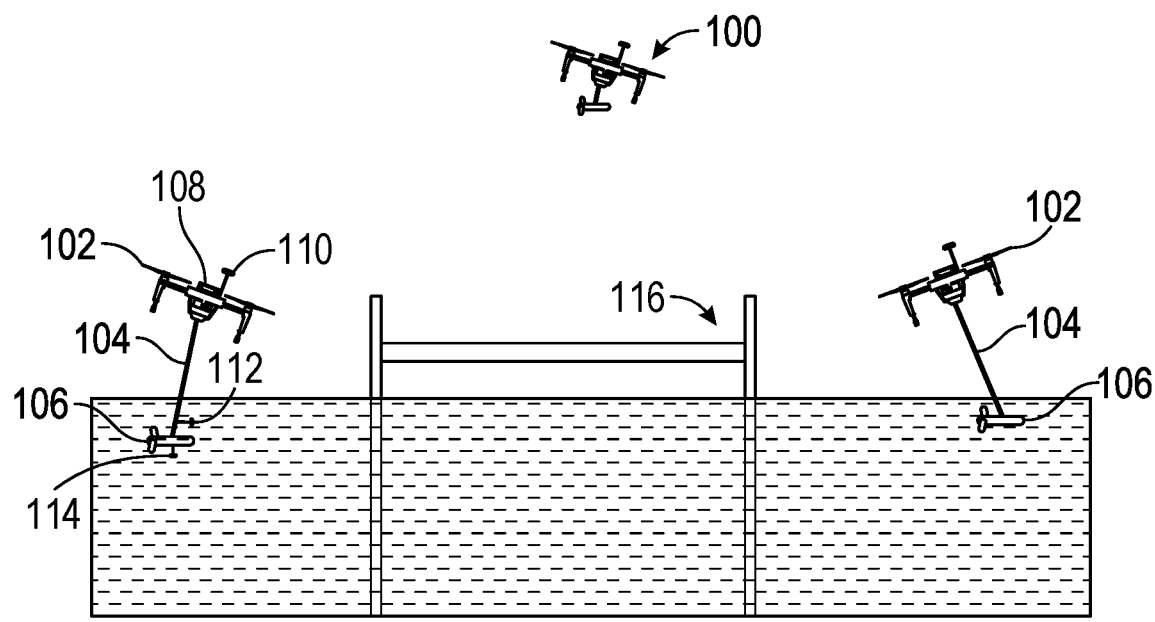
FIGS. 1A-1B depict a multi-media parcel delivery system in accordance with one or more embodiments of the present disclosure.

According to one embodiment, as illustrated in FIG. 1A, the multi-media parcel delivery system 100 drags the parcel 106 in the water, above the water, or on the surface of the water in order to reduce energy cost by using buoyant forces. The multi-media parcel delivery system 100 comprises an aerial vehicle 102, a cable 104, and a parcel 106, which is secured via the cable to the aerial vehicle. Aerial vehicle includes a control system 108 and one or more sensors 110. Cable 104 may include one or more sensors 112 configured to interact with the water. Parcel 106 may include one or more sensors 114 configured to interact with the water and/or measure flow and buoyancy characteristics of the parcel 106 through the water. The sensor(s) may be a part of a re-usable container for the parcel. Control system 108 is configured to collect data from the one or more sensors 110 and one or more sensors 112 and determine a transport trajectory for the parcel through air and through a body of water. In FIG. 1A, the aerial vehicle 102 is depicted as initially dragging parcel 106 in the water. Upon detection of and interaction with object 116, the aerial vehicle 102 increases altitude and/or reduces the length of cable 104 in order to lift parcel 106 out of the water and above the object 116. Object 116 may be a man-made object such as a bridge, a dam, a water-borne vehicle, or the like. Object 116 may be a naturally occurring object such as a strip of land, rocks, debris in the water, or the like. In this way, the system 100 is maneuverable to avoid collisions with both natural and man-made structures, interconnect separate bodies of water, perform individualized delivery, or perform final parcel delivery in areas without water. After successfully avoiding collision with object 116, aerial vehicle 102 may then reduce altitude and/or increase the length of cable 104 in order to reintroduce parcel 106 to the water. The multi-media parcel delivery system 100 may be autonomous and further comprise a processor. The multi-media parcel delivery system 100 employs a dynamic model and optimizes trajectories using diverse cost functions such as time, distance, effort, energy, etc. It may also include sensors and/or communications systems, known in the art, which may permit factoring weather and/or water conditions along possible and selected trajectories.

The aerial vehicle 102 may include a multicopter/payload system with multiple degrees of freedom (DOF). For example, the aerial vehicle 102 may be a quadcopter system with 3 or 6 DOF specifically. However, any aerial vehicle system with multiple degrees of freedom operating in 2 or 3D workspaces may be used. Suitable multicopters and other aerial vehicles are known in the art.

The parcel 106 may be essentially any suitable cargo or container therefor. It may be a product of manufacture or a suitable container holding one or more products therein. In particular embodiments, the parcel 106 is configured for efficient movement through a multi-media system. For example, the parcel 106 may be designed to have hydrodynamic and aerodynamic characteristics, as well as water resistant or waterproof construction.

Figure 1B:
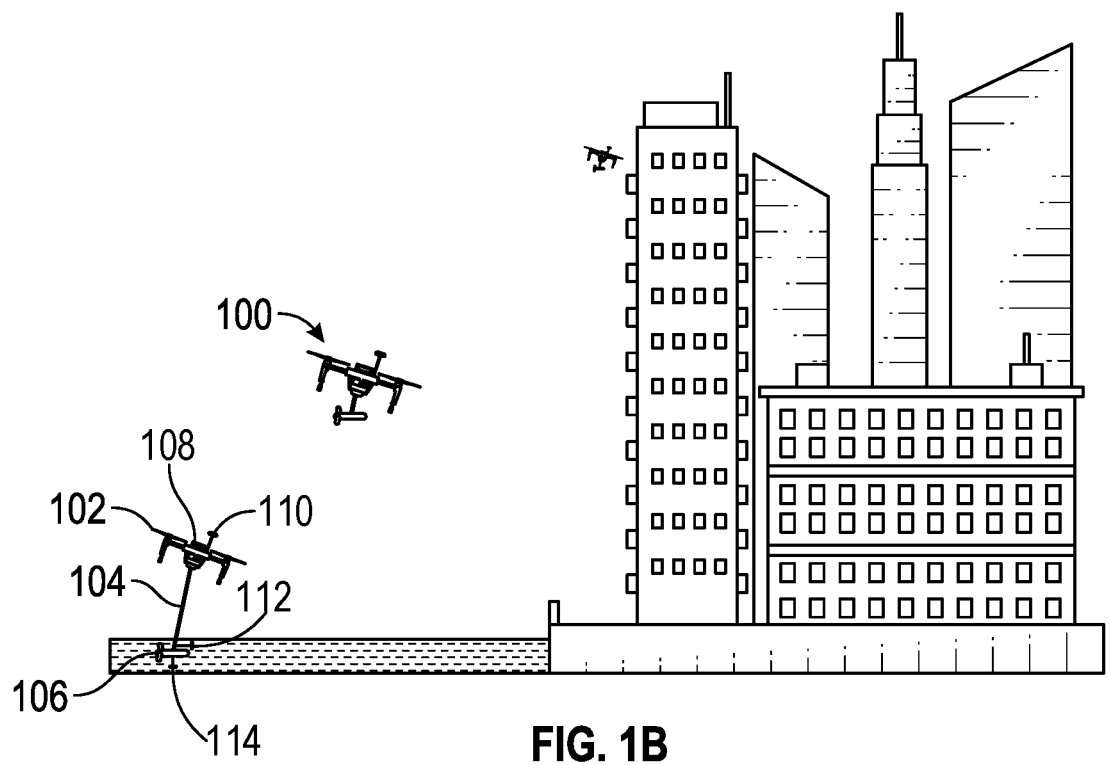

FIG. 1B illustrates a multi-media parcel delivery system 100 including aerial vehicle 102, cable 104, and parcel 106. Initially, aerial vehicle 102 drags the parcel 106 on the surface of the water (or submerged or partially submerged just below the surface of the water) before lifting the parcel 106 into the air, either through an increase in altitude, a reduction of the length of cable 104, or both, in anticipation of navigating man-made structures such as buildings, and sometimes in anticipation of performing final delivery.

In some preferred embodiments, a control system operated by the at least one processor (and memory) is configured to control operating parameters including (i) velocity, altitude, and pose of the aerial vehicle, (ii) length and orientation of the cable extending between the aerial vehicle and the parcel, and (iii) parcel depth within the one or more bodies of water. The control system may further utilize a dynamic model involving the aerial vehicle, parcel, and surrounding environment. The surrounding environment may include one or more forces operating on the aerial vehicle and parcel, including, but not limited to, gravity or drag forces. The multi-media parcel delivery system may have a sensor configured to determine a bed profile of the water media, as depicted in FIG. 2B. The multi-media parcel delivery system may have a sensor configured to detect obstacles, and may be informed by geopositional data to better facilitate detection of permanent or semi-permanent objects such as bridges, dams, construction, or the like.

Figure 2A:
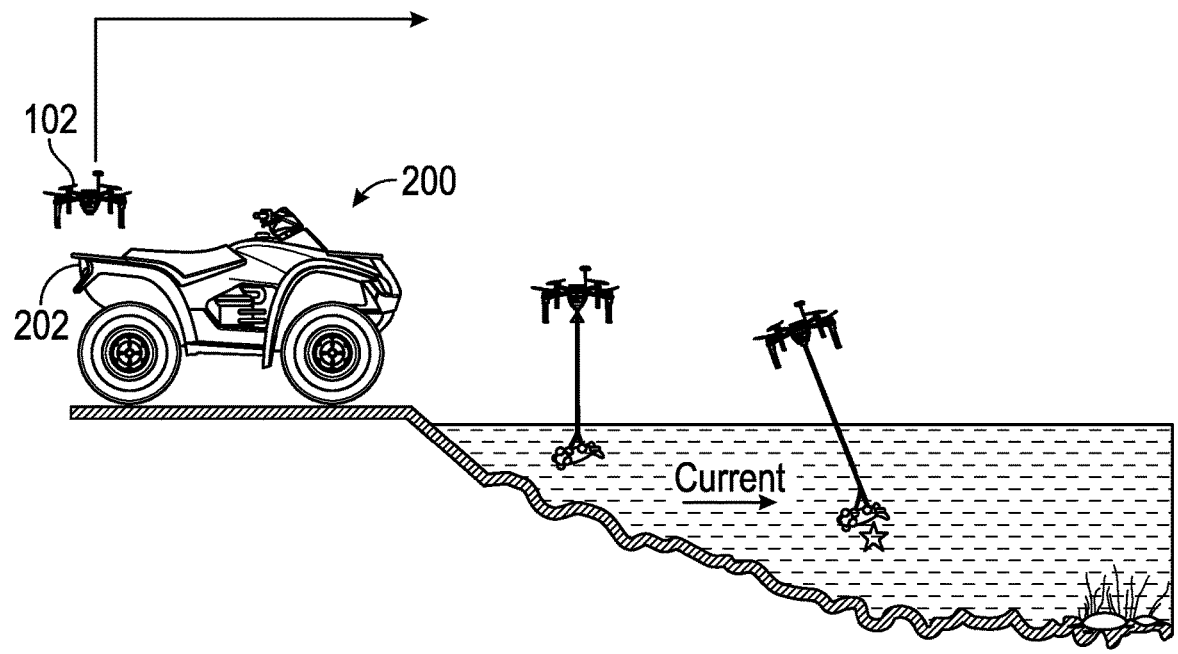
FIGS. 2A-2B depict a multi-media parcel delivery system in accordance with one or more embodiments of the present disclosure.
Figure 2B:
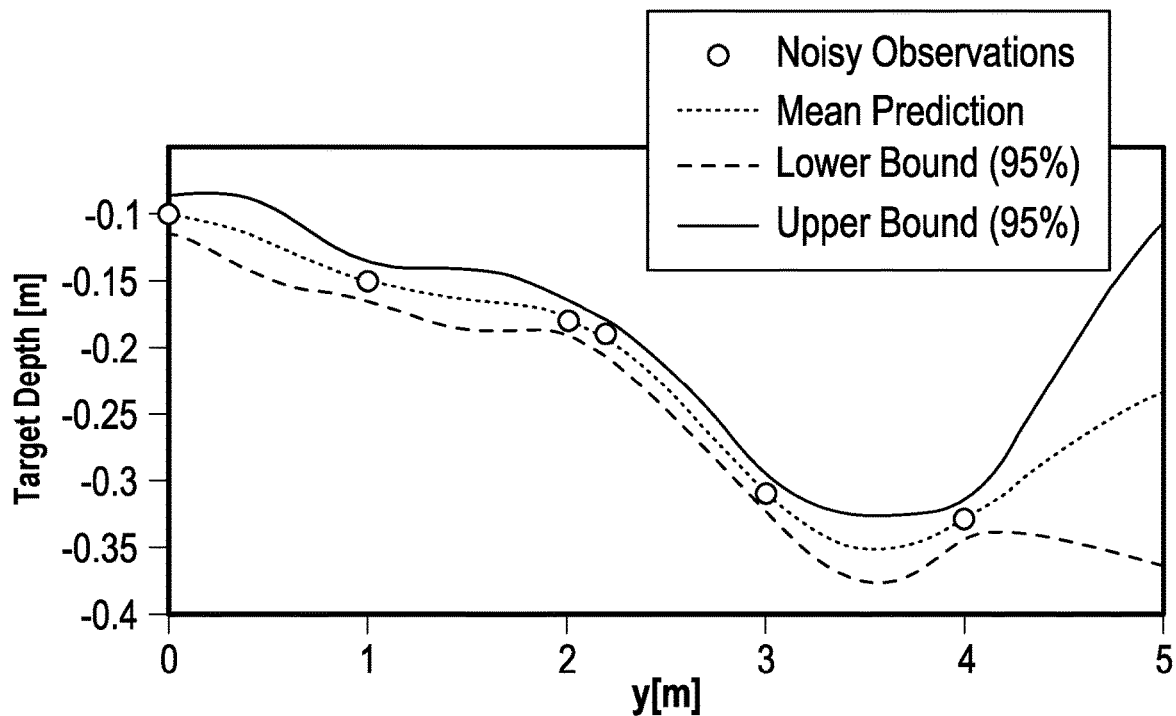

FIG. 2A illustrates use of a multi-media parcel delivery system 200 including an all-terrain vehicle 202 and aerial vehicle 102. In FIG. 2A, aerial vehicle 102 is depicted as initially coupled to all-terrain vehicle 202. In this way, aerial vehicle 102 may be transported to a certain position before decoupling and taking over primary responsibility for parcel transportation and delivery. For example, when the parcel is initially readied for shipment, it may be positioned at a location remote to a body of water such that an initial transportation stint involving a ground vehicle is more efficient. Upon arriving at a body of water, where buoyancy forces that counteract the force of gravity and increase efficiency of the aerial vehicle, as described herein, the aerial vehicle will then be launched. Although an all-terrain vehicle is depicted in FIG. 2A, any suitable ground vehicle, e.g., a wheeled gas- and/or electric-powered vehicle, may be used for transporting the aerial vehicle to the body of water.

FIG. 2B graphically depicts the target parcel depth versus distance from shore for the system 200 illustrated in FIG. 2A. The graph in FIG. 2B is generated by, for example, a control system as described herein that is equipped with sensors for determining the bed profile for the water. These sensors may detect the water depth, the water current, the turbidity of the water, the temperature of the water, the salinity level, topography of the ground beneath the water, and/or obstacles that may be present. After detection of and consideration of these various parameters, the control system may be configured to predict a target depth for transporting the parcel with increased efficiency. For example, water current characteristics at a certain distance from shore, such as a rip tide, may generate significantly more drag or parcel friction at a certain depth such that the parcel is more efficiently transported at an increased or decreased depth, depending on the current characteristics.

Figure 3:
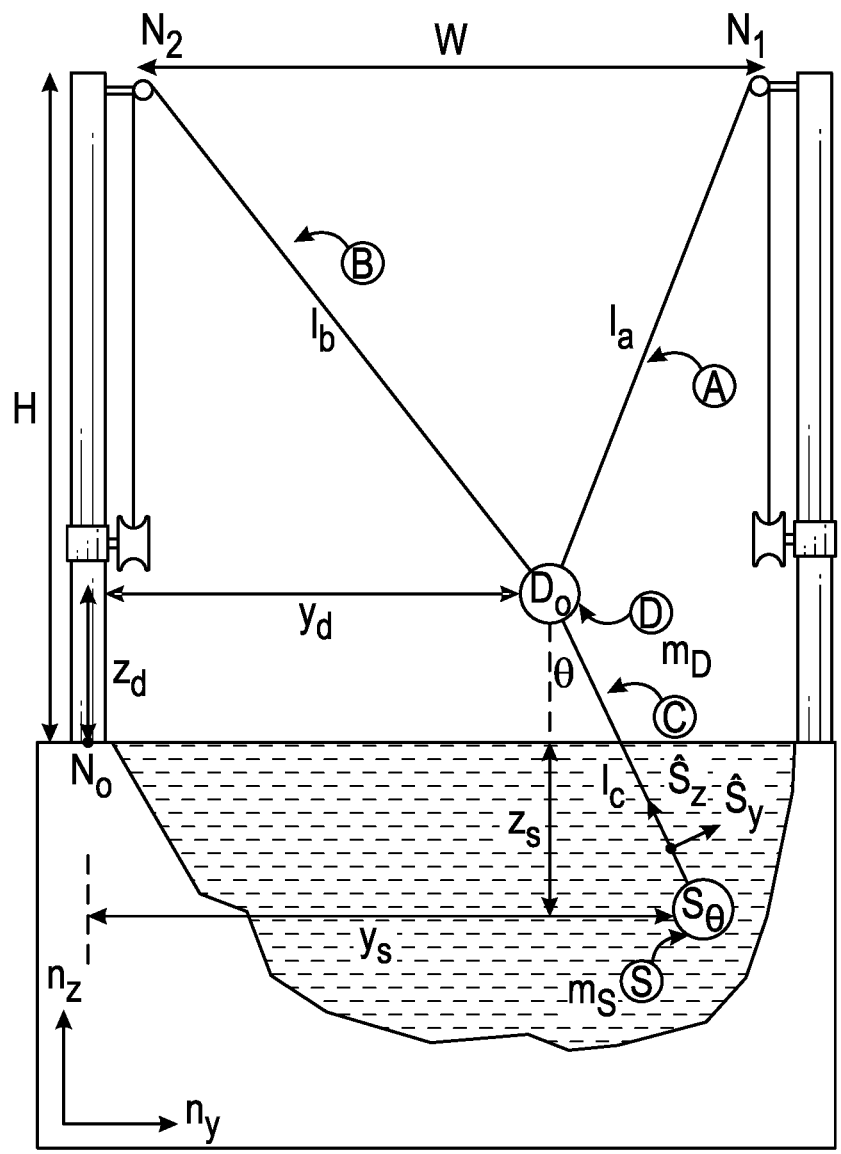
FIG. 3 depicts a dynamic model of a two-body system in water used to illustrate one or more embodiments of the present disclosure.

An illustrative example, which comprises an under actuated cable robot with a suspended payload is shown in FIG. 3. Detailed modeling, calculations, and trajectory optimization with this system and related under actuated systems can be found in Ordonez, C., Jay, D., & Hubicki, C. (2022). *Trajectory Planning for Sensors and Payloads Moving Through Mixed and Uncertain Media*, which is hereby incorporated by reference in its entirety. By modeling the system dynamics, the optimized path and trajectory through mixed media can be calculated.

The illustrated optimized calculations for water-to-water media and air-to-air media, combined with the water-to-water motion with uncertain riverbed profile can be extended to systems with higher degrees of freedom and used to plan motions for systems using aerial vehicles with suspended parcels. Planned motions can include crossing of media air-water and water-air, and dragging maneuvers with partially submerged payloads.

Figure 4:
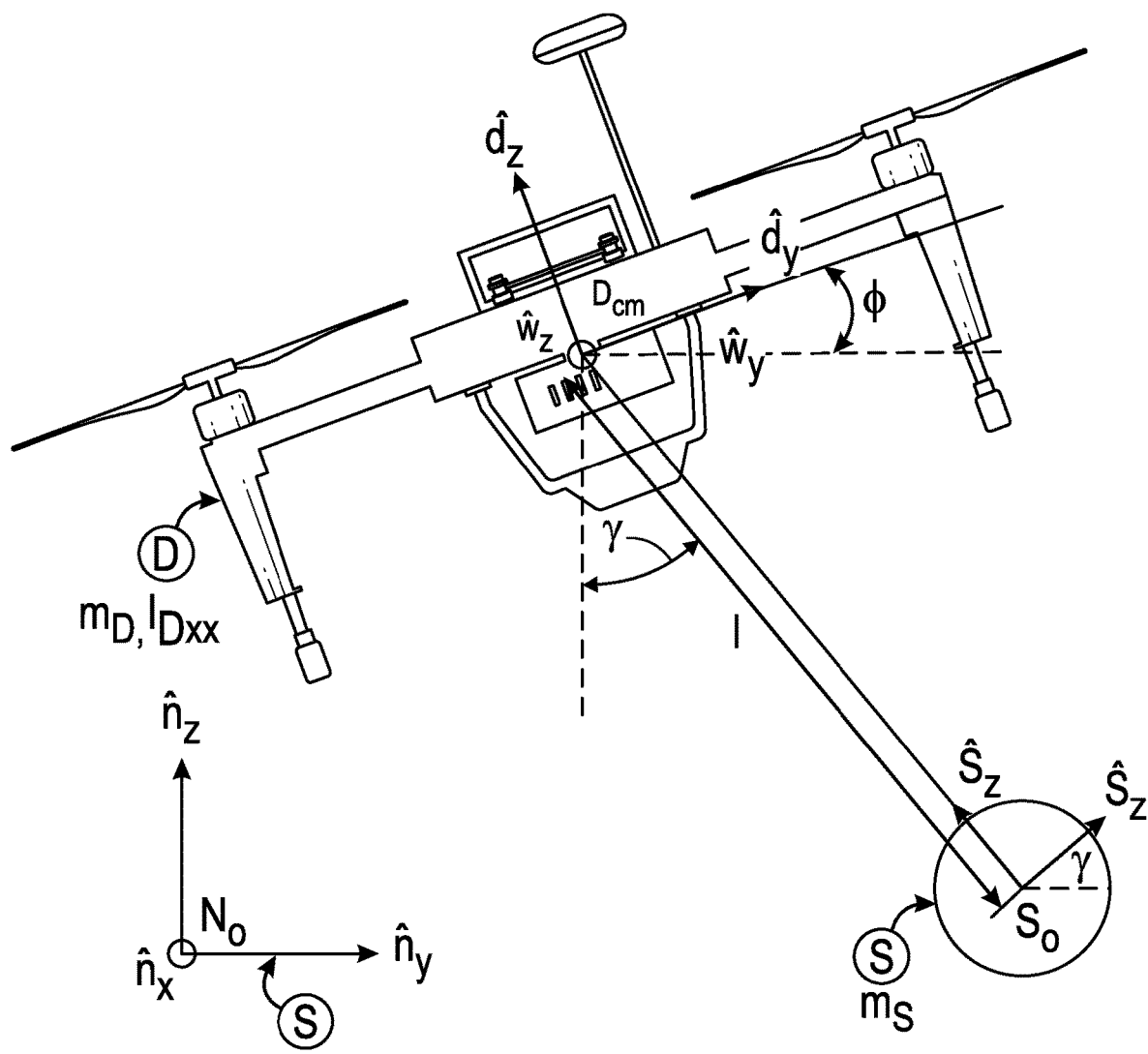
FIG. 4 depicts an aerial vehicle with suspended parcel in accordance with one or more embodiments of the present disclosure.

FIG. 4 shows an aerial vehicle (D) with suspended parcel (S). The system inputs are optimized to calculate a motion that allows the parcel to move and reach desired configurations despite environmental factors such as water current. The system is also able to compare locomotion efforts through different media and determine the mass ratio of payload to aerial vehicle that results in most efficient trajectories.

Dynamic Modeling and Underwater Ground Surface Representation

Using the Newton-Euler formulation, the dynamic model of the system of FIG. 3 can be calculated as shown below.

TABLE 1

Identifiers for FIG. 3

| Description | Symbol | Type | value |
|---|---|---|---|
| Mass of D | $m_D$ | constant | 0.48 kg |
| Mass of S | $m_S$ | constant | 0.95 kg |
| Radius of S | $R_S$ | constant | 0.05 m |
| Frontal area of S | A | constant | 0.0079 m$^2$ |
| Earth's gravitational constant | g | constant | 9.8 m/s$^2$ |
| Drag coefficient of S | $C_D$ | constant | .5 |
| Density of water | $\rho_w$ | constant | 997 kg/m$^3$ |
| ñy measure of D's position from $N_o$ | $y_d$ | variable | m |

TABLE 1-continued

Identifiers for FIG. 3

| Description | Symbol | Type | value |
|---|---|---|---|
| ñz measure of D's position from $N_o$ | $z_d$ | variable | m |
| ñy measure of S's position from $N_o$ | $y_s$ | variable | m |
| ñz measure of S's position from $N_o$ | $z_s$ | variable | m |
| Angle from ñz to ŝz with + ñx sense | θ | variable | rad |
| Length of cable A | $l_a$ | variable | m |
| Length of cable B | $l_b$ | variable | m |
| Length of Cable C | $l_c$ | constant | 0.57 m |
| Distance between $N_1$ and $N_2$ | W | constant | 2.05 m |

Using the Newton-Euler formulation, the dynamic model of the system of FIG. 3 can be casted as described in Formula [1]:

$$M\begin{bmatrix} yd \\ zd \\ \theta \end{bmatrix} = B, \quad [1]$$

where $$M = \begin{bmatrix} m_d + m_s & 0 & l_c m_s \cos\theta \\ 0 & m_d + m_s & l_c m_s \sin\theta \\ m_s \cos\theta & m_s \sin\theta & l_c m_s \end{bmatrix},$$

$$B = \begin{bmatrix} l_c m_s \sin\theta\dot\theta^2 + \frac{W - y_d}{l_a}F_1 - \frac{y_d}{l_b}F_2 + F_{dy} \\ -l_c m_s \cos\theta\dot\theta^2 - (m_s + m_d)g + \frac{H - z_d}{l_a}F_1 + \frac{H - z_d}{l_b}F_2 + F_b + F_{dz} \\ -m_s g\sin\theta + F_b\sin\theta + F_{dy}\cos\theta + F_{dy}\sin\theta \end{bmatrix}$$

where $F_1$ and $F_2$ are system inputs representing the tension forces on the cables A and B respectively. The buoyant force $F_b$ acting on the sensor is calculated according to Formula [2]:

$$F_b = \frac{4}{3}\pi R_s^3 g\rho_w \hat{n}_z \quad [2]$$

where $F_{d_y}$ and $F_{d_z}$ are components of the drag force on the sensor. Assuming the water has an absolute velocity $N_{v_w}=v_{w_y}\hat{n}y+v_{w_z}\hat{n}z$, the relative velocity of S with respect to the water is then given by Formula [3]:

$$v_{rel}=(l_c \cos\theta\dot\theta+\dot y_d-v_{w_y})\hat{n}_y+(l_c \sin\theta\dot\theta+\dot z_d-v_{w_z})\hat{n}_z, \quad [3]$$

which yields Formula [4] for $F_{d_y}$ and Formula [5] for $F_{d_z}$:

$$Fd_y=-0.5\rho_w AC_D\|V_{rel}\|v_{y_{rel}} \quad [4]$$

$$Fd_z=-0.5\rho_w AC_D\|V_{rel}\|v_{z_{rel}} \quad [5]$$

Underwater Ground Surface Profiles

Riverbeds and bodies of water have various profiles that fall under categories such as riffle, drop-off, run, pools, and tails. By observing water features, the type of profile can be determined. A tail profile is described herein, but other types of water profile may be traversed by the system.

Gaussian Processes (GP) regression is employed to model a riverbed tail profile. Other methods are suitable for use for modeling the water media for traversal by the system. With n training measurements, D={$(y_i, z_i)$|i=1, . . . , n}, where $y_i$ represent the horizontal position along the profile and $z_i$ are noisy depth observations. The expected value of water depth $\bar z_*$ at a new testing point y* is given by Formula [6]:

$$\bar z_*=h(y_*)^T\beta+\Sigma_{i=1}^n\alpha_i k(y_i,y_*), \quad [6]$$

The variance of water depth is given by Formula [7]:

$$V[z_*] = k(y_*, y_*) - k_*^T(K + \sigma_n^2 I)^{-1} k_*, \quad [7]$$

where h(y) are a set of fixed basis functions. Further details on GP's can be found in C. Rasmussen and C. Williams, *Gaussian Processes for Machine Learning*. Cambridge, MA: The MIT Press, 2006.

Optimization Framework

The state of the cable robot in FIG. 3 is $x = [y_d z_d \theta \dot{y}_d \dot{z}_d \dot{\theta}]^T$, and its equations of motion in state space form $\dot{x} = f(x, u)$. The system control inputs u are the forces $F_1$ and $F_2$, which correspond to forces on cables A and B. J represents the cost function to minimize. A motion maneuver to take the system from an initial state to a final state can be posed as the following optimization problem, minimizing J (x(.), u(.), T) subject to $$\dot{x} = f(x, u)$$

$$x(0) = x_0$$

$$y_s(T) = y_{sf}; \; z_s(T) = z_{sf}$$

$$\dot{y}_d(T) = 0; \; \dot{z}_d(T) = 0; \; \dot{\theta}(T) = 0$$

$$\ddot{y}_d(T) = 0; \; \ddot{z}_d(T) = 0; \; \ddot{\theta}(T) = 0$$

$$F_{1_{min}} \leq F_1 \leq F_{1_{max}}$$

$$F_{2_{min}} \leq F_2 \leq F_{2_{max}}$$

$$F_{3_{min}} \leq F_3 \leq F_{3_{max}}$$

$$-i_{a_{max}} \leq i_a \leq i_{a_{max}}; \; -i_{b_{max}} \leq i_b \leq i_{b_{max}}$$

$$z_s^i > z_{up}, \; i = 1, 2 \ldots m$$

As an illustration, two cost functions are considered for trajectory optimization of the system 100 to generate efficient trajectories, a time cost function, J=T, and an effort cost function, $J = \int_0^T (F_1^2(t) + F_2^2(t)) dt$. The force $F_3$ is the tension on cable C, $i_a$ and $i_b$ are the velocities of cables A and B. Finally, $z_s^i$ corresponds to the vertical positions of the discrete points around the periphery of the payload and $z_{up}$ represents the upperbounds of the uncertain riverbed profile calculated by Formulas [6] and [7] above. A non-linear program (NLP) is formulated via direct colocation using smooth and exact derivatives of the objective function and all constraints using the MATLAB COALESCE framework. A solution is generated using the large-scale NLP solver IPOPT.

The present disclosure may be further understood with reference to the following non-limiting examples.

Example 1

Using a cable robot, the payload of FIG. 3 goes from rest at $(y_s, z_s) = (0.28, -0.20)$m to a final resting position at $(y_s, z_s) = (1.5, -0.20)$m while minimizing the cost function J=T. The minimum and maximum tension forces in cables A and B were $F_{1_{min}} = F_{2_{min}} = 0.1$N and $F_{1_{max}} = F_{2_{max}} = 20$N respectively. For cable C, the minimum and maximum tensions were set at $F_{3_{min}} = 0.1$N and $F_{3_{max}} = 50$N. Two simulations were performed by changing the maximum cable speeds of A and B from 0.3 m/s to 1.5 m/s. These simulations did not include a riverbed.

Figure 5:
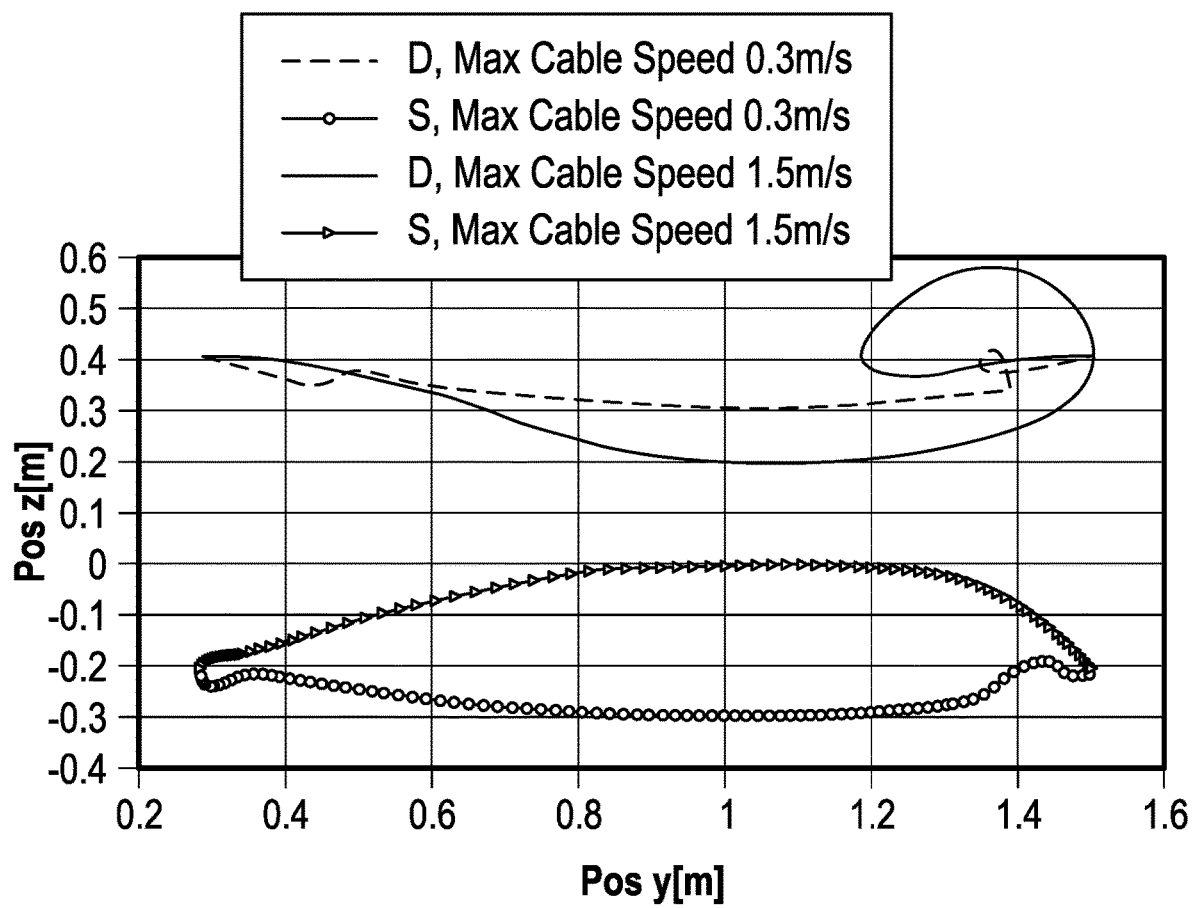
FIG. 5 depicts the position of the bodies in FIG. 3 as a function of cable speed.
Figure 6:
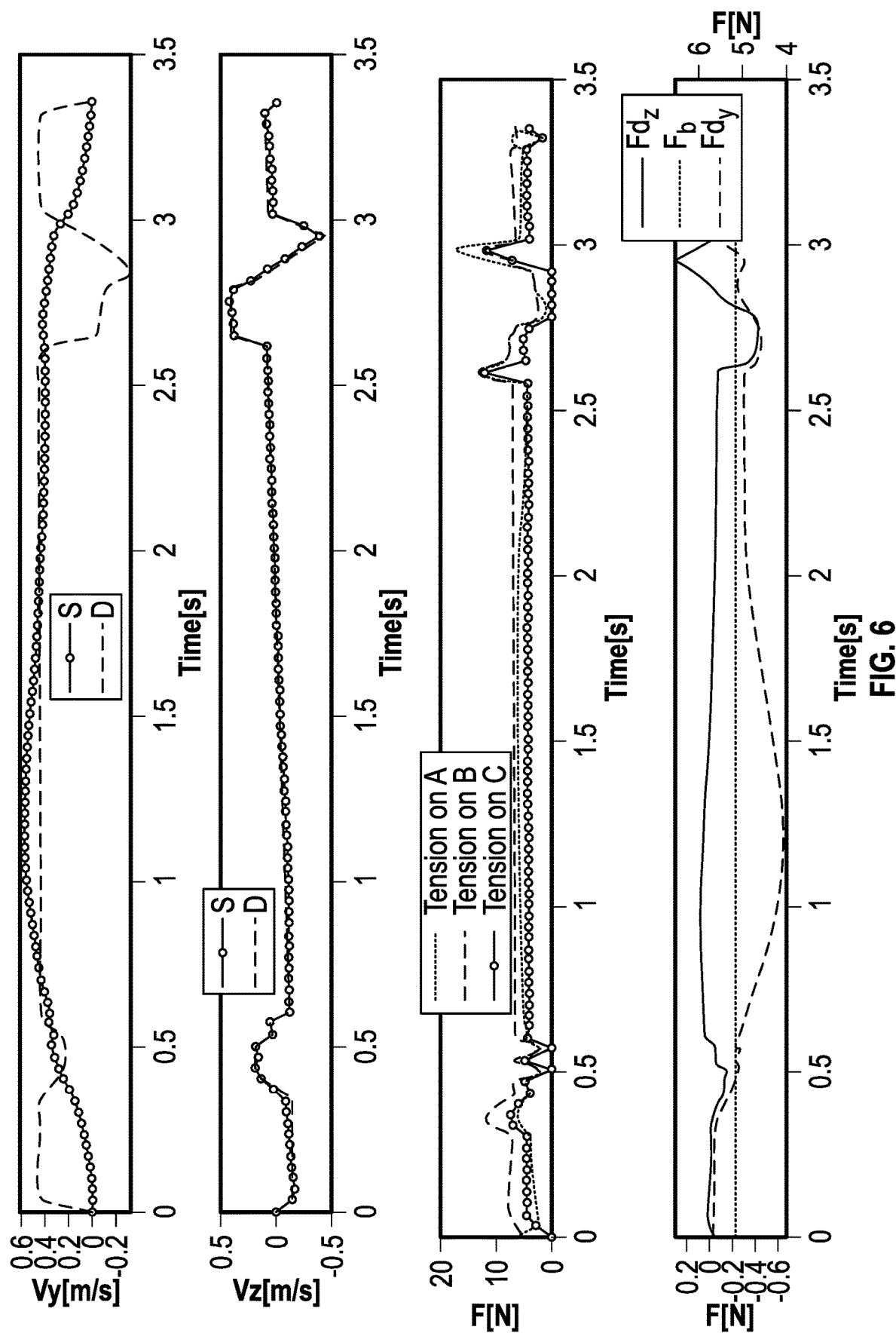
FIG. 6 depicts the tension, drag, and buoyant forces acting on the sensor in FIG. 3.

FIG. 5 shows positions of D and S in FIG. 3 for the different cable speeds, and FIG. 6 illustrates the tensions on all the cables, the drag, and buoyant forces acting on the sensor for the simulation with cable speed limits of 0.3 m/s.

Limiting cable speed has a significant effect on resultant minimum time trajectory. At high cable speeds, the preferred approach by the optimization is to gain speed early on, which caused the payload angle to significantly increase. In addition, the system was able to perform a larger loop towards the end of the trajectory as a mechanism to bring the payload to rest.

Other simulations changed the media, cost function, and limits on cable velocities as shown in Table 2 below. For this configuration, the planned trajectories require longer times in water to water media, but significantly larger effort in air to air media. Using the minimum effort cost function with a max cable velocity of 0.3 m/s, the air to air trajectory requires 124.6% more effort than the trajectory in water. For a max cable velocity of 4 m/s, the air to air trajectory requires 79.1% more effort than the water to water trajectory. This important result can be explained due to the dominance that the buoyant force has over the drag forces acting on the payload.

Computation for Example 1 was carried out on an Intel Core i7 CPU @ 2.6 GHz and 16 GB of RAM. The mean computational times were 0.87 s for minimum time trajectories and 1.43 s for minimum effort trajectories.

TABLE 2

Example 1 data

| | Velocity 0.3 m/s | | | | Velocity 0.4 m/s | | | |
| --- | --- | --- | --- | --- | --- | --- | --- | --- |
| | Min Time | | Min Effort | | Min Time | | Min Effort | |
| Media | Time (s) | Effort ($N^2S$) | Time (s) | Effort ($N^2S$) | Time (s) | Effort ($N^2S$) | Time (s) | Effort ($N^2S$) |
| Water to water | 3.355 | 278.88 | 3.398 | 254.60 | 1.147 | 283.46 | 1.628 | 128.051 |
| Air to air | 3.02 | 583.23 | 3.04 | 571.927 | 0.890 | 360.273 | 1.082 | 229.414 |

Example 2

Figure 7:
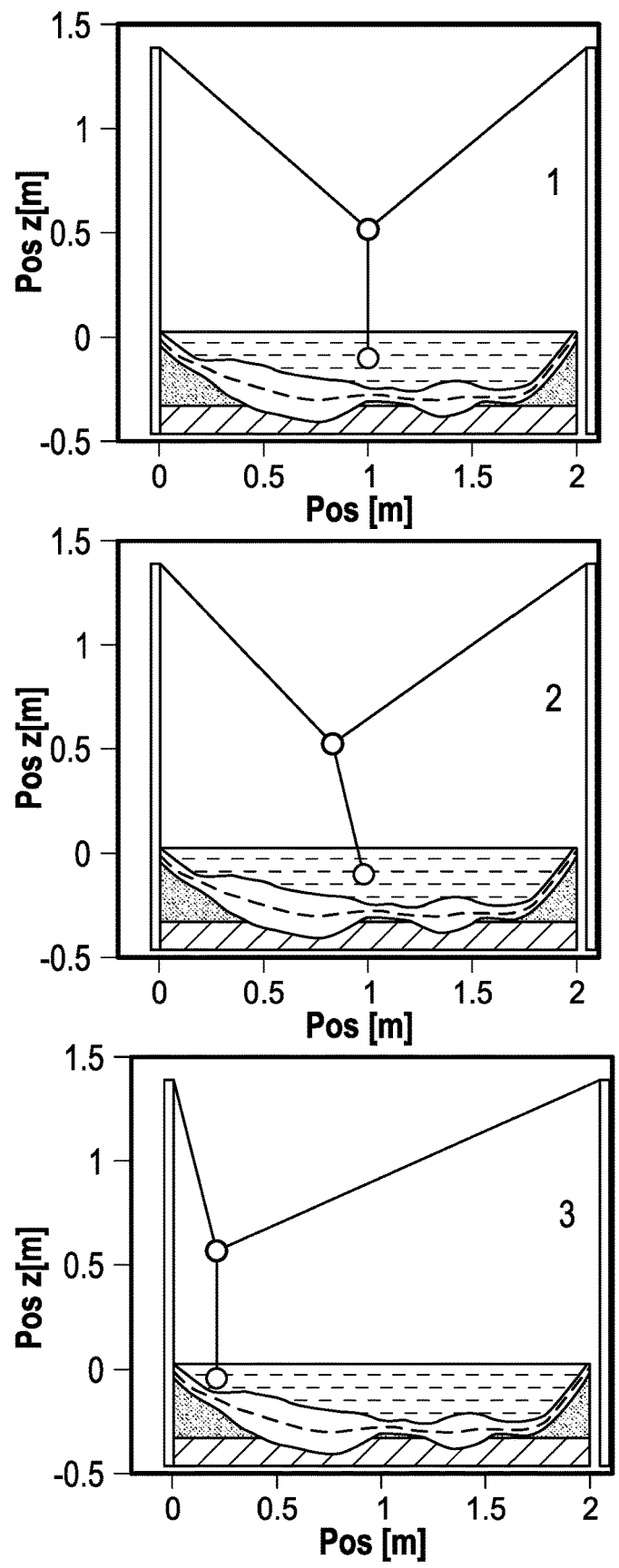
FIG. 7 depicts a maneuver of a two-body system in accordance with an exemplary embodiment of the disclosure.

In another Example using a cable robot, the payload was required to go from rest at $(y_s, z_s) = (1.0, -0.1)$m to a final resting position at $(y_s, z_s) = (0.2, -0.04)$m while minimizing a time cost function J=T. This Example used water to water motion with an uncertain riverbed profile. The speeds of cables A and B were constrained to 0.3 m/s and the tension force limits were kept at the same values as Example 1. However, in this simulation, the payload was required to avoid collisions with the upper bound of the riverbed profile with a 95% confidence. FIG. 7 illustrates a series of frames, from the frame 1, to frame 2, to frame 3, of the maneuver performed by the system. The computational time to obtain this trajectory was of 1.3 s.

Example 3

Figure 8:
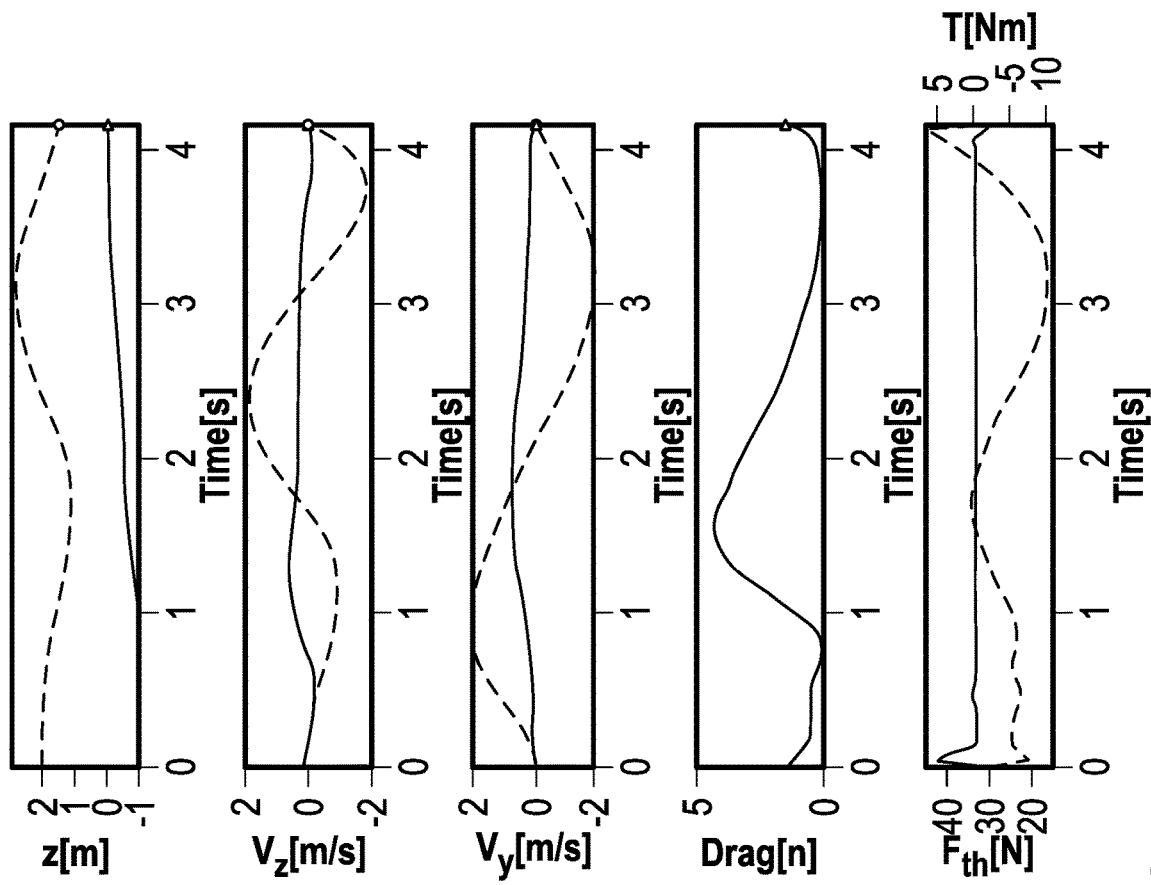
FIG. 8 depicts the results of a water-to-water trajectory analysis in accordance with one or more embodiments of the present disclosure.
Figure 8:
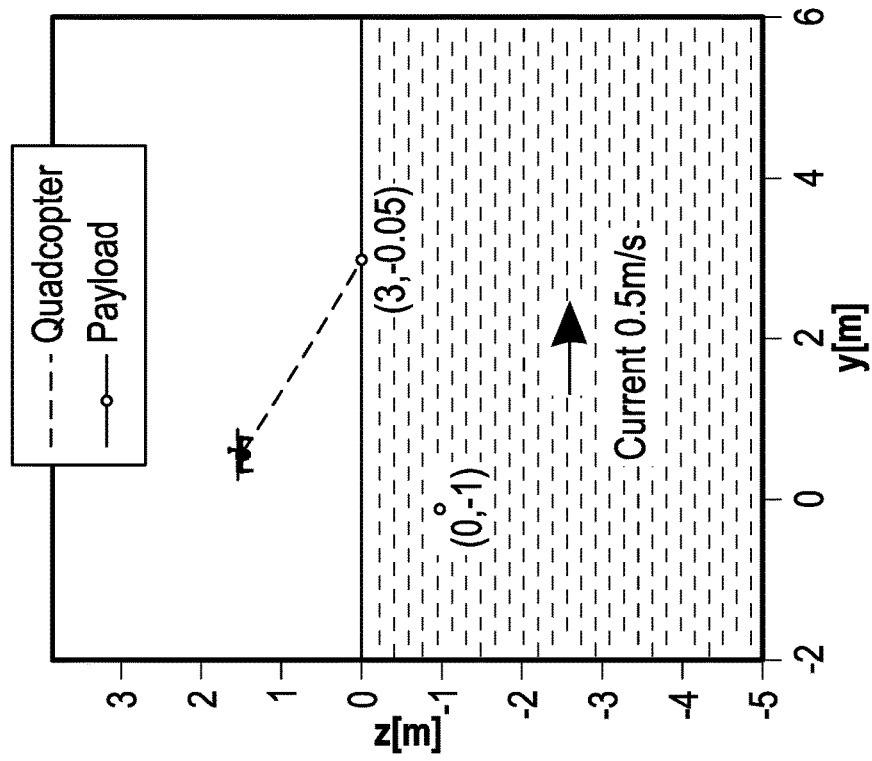

Using a quadcopter with suspended payload as shown in FIG. 4 was used instead of a cable robot. The mass of the quadcopter was 2.35 kg with a payload of 0.99 kg (approximated as 1.0 kg in FIG. 8) attached to a 3 m long cable. The roll angle, $\Phi$, was constrained to $\pm 30°$ and the cable angle, $\gamma$, to $\pm 70°$. This example has a system input of net thrust force, $F_{th}$, and the net moment, $\tau$, exerted by the propellers on the quadcopter D. FIG. 8 illustrates the results from a water to water trajectory where the payload was required to go from rest at $(0, -1)$m to a resting position at $(3, -0.05)$m. In this scenario, a water current of 0.5 m/s was introduced. The planned trajectory plans a motion so that the payload can remain stationary in the final configuration despite the water current. The computational time was 6.3 s.

Figure 9:
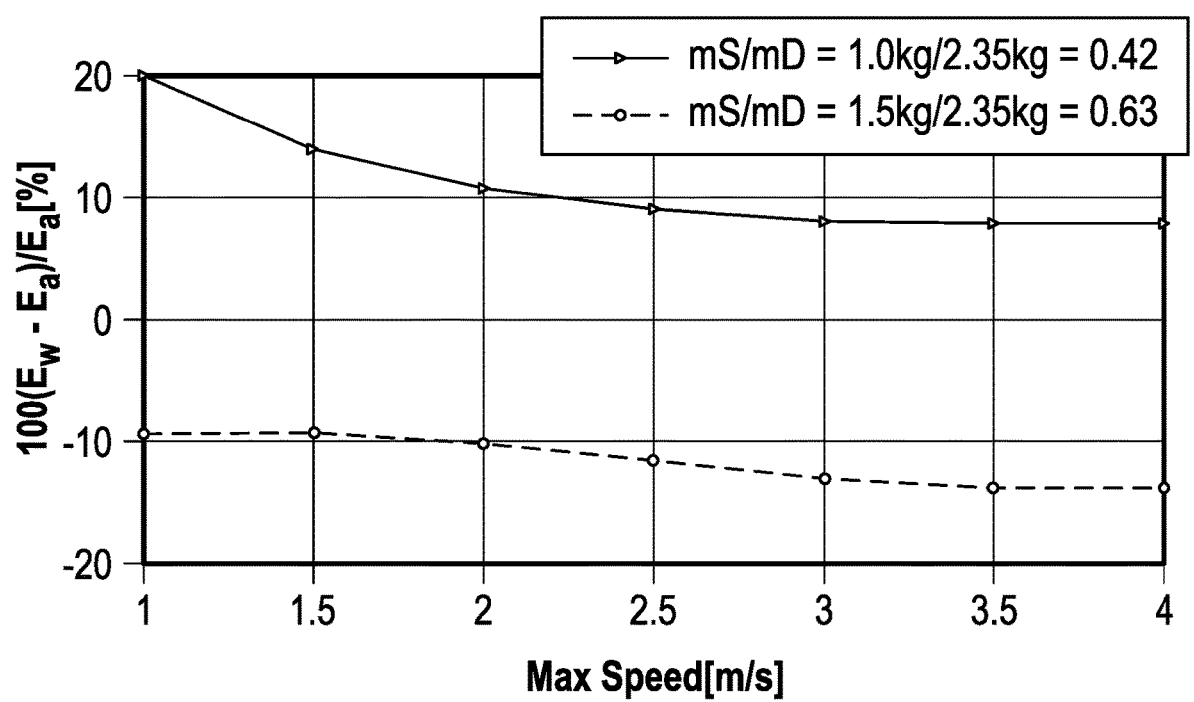
FIG. 9 depicts a comparison of effort for a water-to-water maneuver and an air-to-air maneuver in accordance with one or more embodiments of the present disclosure.

The planar quad system was also used to compare efforts in the different media for two different payload to quadcopter mass ratios and multiple maximum net speeds of the aerial vehicle. The cost function was effort, $J=\int_0^T (F_{th}^2(t)+\tau^2(t))dt$, and in all cases the task was to take the payload from a resting position at $(0, -1)$m to a resting position at $(3, -0.05)$m. The current was not present in these tests. FIG. 9 depicts that for the 0.42 mass ratio, the water to water maneuver was more costly than the air to air maneuver and the difference decayed as the maximum speed of the quadcopter increased. In contrast, for the 0.63 mass ratio, the water to water trajectory was more efficient, with a gain in efficiency observed as the speed increased. FIG. 9 depicts the effort in air $E_a$ and effort in water $E_w$. The payload configuration dictates the preferred media. When interpreting these results is important to keep in mind that the task is not to simply get the payload to a waypoint but to stop. In addition, while it is clear that drag increases with speed, the duration of the trajectories also gets shorter. Finally, when the system navigates with the payload in water, there is the added benefit of the buoyant force.

Example 4

Figure 10:
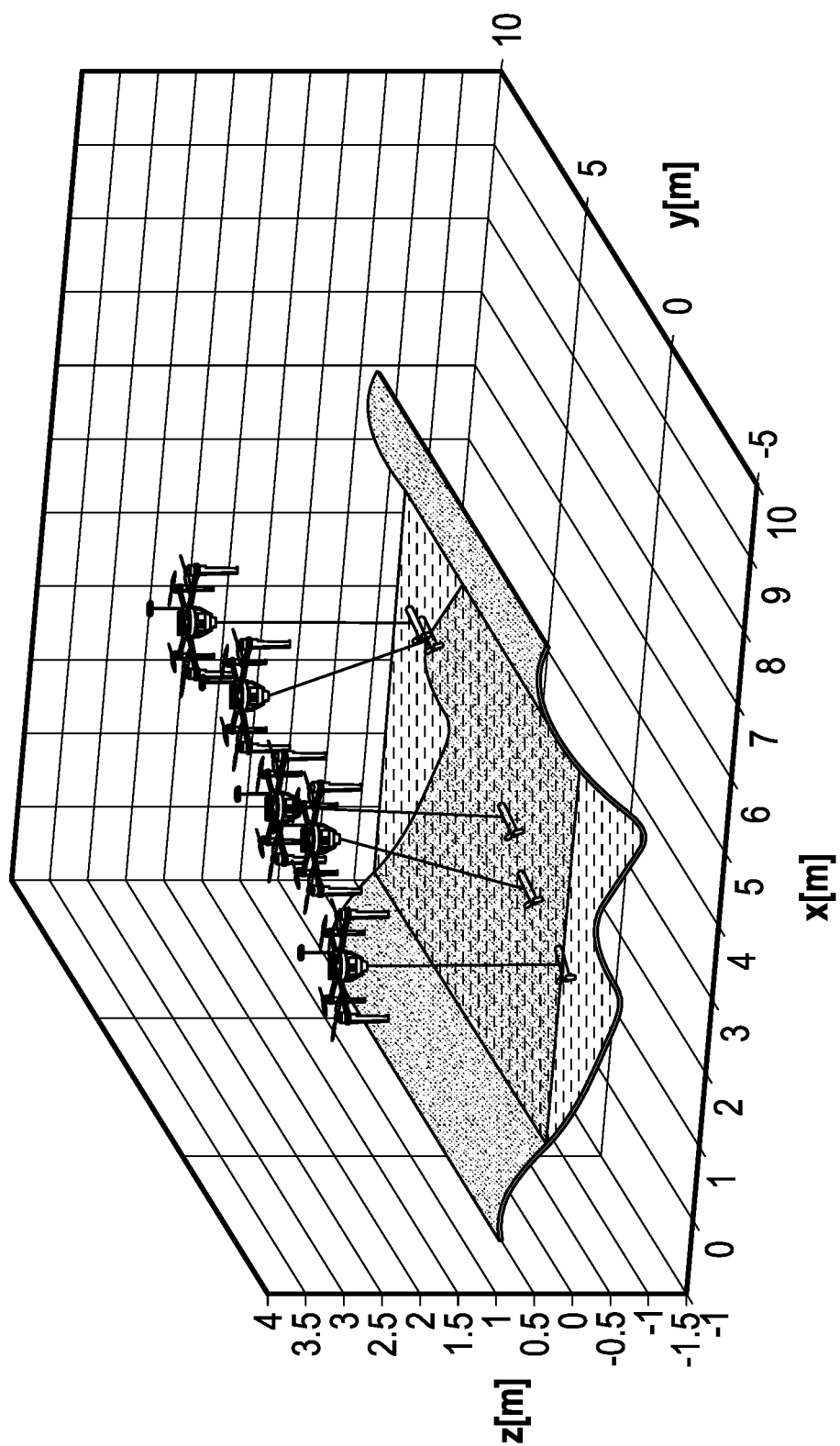
FIG. 10 depicts the results of a simulation of an 8-degrees-of-freedom (DOF) system in accordance with one or more embodiments of the present disclosure.

FIG. 10 depicts a simulation of an 8-DOF system performing a minimum effort, $J=\int_0^T (F_{th}^2(t)+\tau_x^2(t)+\tau_y^2(t)+\tau_z^2(t))dt$ water to water maneuver to take the payload from a resting position at $(2.16, -1.5, -0.1)$m to a resting position at $(4, 6, -0.05)$m. The computational time was 15.9 s.

Modifications and variations of the methods and systems described herein will be obvious to those skilled in the art from the foregoing detailed description. Such modifications and variations are intended to come within the scope of the appended claims.

What is claimed is:

1. A multi-media parcel delivery system comprising:
an aerial vehicle;
a cable having a first end connected to the aerial vehicle and second end configured to connect to and support a parcel suspended therefrom, the aerial vehicle being configured to drag the parcel, via the cable, through air and through water; and
a control system configured to determine a transport trajectory for the parcel through air and through a body of water;
wherein the control system is configured to control operating parameters including (i) velocity, altitude, and pose of the aerial vehicle, and (ii) a length and orientation of the cable extending between the aerial vehicle and the parcel.

2. The multi-media parcel delivery system of claim 1, wherein the control system comprises one or more sensors configured to characterize the environment along a trajectory of the aerial vehicle, the cable, and/or the parcel.

3. The multi-media parcel delivery system of claim 2, wherein at least one sensor is configured to detect obstacles along the trajectory.

4. The multi-media parcel delivery system of claim 2, wherein at least one sensor is affixed to the cable and is configured to be dragged in and out of water to determine a bed profile of a water media.

5. The multi-media parcel delivery system of claim 2, wherein the one or more sensors are configured to measure a water depth, water current, turbidity, temperature, salinity, and/or ground properties of a water media along the trajectory.

6. The multi-media parcel delivery system of claim 2, wherein the control system is configured to modify the operating parameters based on data collected from the one or more sensors.

7. The multi-media parcel delivery system of claim 1, further comprising a ground vehicle configured to launch the aerial vehicle in proximity to the body of water.

8. The multi-media parcel delivery system of claim 1, wherein the aerial vehicle is an autonomous multicopter.

9. The multi-media parcel delivery system of claim 1, wherein the control system is configured to utilize a dynamic model involving the aerial vehicle, parcel, and surrounding environment.

10. A method for delivering a parcel, the method comprising:
loading a parcel onto a cable connected to an aerial vehicle, the aerial vehicle being configured to drag the parcel, via the cable, through air and through water;
determining a transport trajectory for the parcel through air and through a body of water;
controlling, with a control system, operating parameters including (i) velocity, altitude, and pose of the aerial vehicle, and (ii) a length and orientation of the cable extending between the aerial vehicle and the parcel; and
delivering the parcel.

11. The method of claim 10, further comprising sensing, via one or more sensors, an environment along a trajectory of the aerial vehicle, the cable, and/or the parcel.

12. The method of claim 11, further comprising sensing a water depth, water current, turbidity, temperature, salinity, and/or ground properties of a water media.

13. The method of claim 11, further comprising modifying the operating parameters based on data collected from the one or more sensors.

14. The method of claim 10, wherein the parcel is configured to be transported through air and through water.

15. The method of claim 10, wherein the parcel is configured to be transported across land, through air, and through water.

16. The method of claim 15, further comprising:
using a ground vehicle to transport the aerial vehicle with the connected cable and parcel to a position in proximity to a body of water; and
launching the aerial vehicle, cable and parcel from the ground vehicle.

17. The method of claim 10, wherein the aerial vehicle is an autonomous multicopter.

* * * * *